(12) United States Patent
Kunze et al.

(10) Patent No.: US 7,521,017 B2
(45) Date of Patent: Apr. 21, 2009

(54) LASER FABRICATION OF DISCONTINUOUSLY REINFORCED METAL MATRIX COMPOSITES

(75) Inventors: Joseph M. Kunze, Tewksbury, MA (US); Horst Gigerenzer, Hudson, NH (US); Chaolin Hu, N. Billerica, MA (US)

(73) Assignee: Triton Systems, Inc., Chelmsford, MA (US)

( * ) Notice: Subject to any disclaimer, the term of this patent is extended or adjusted under 35 U.S.C. 154(b) by 500 days.

(21) Appl. No.: 10/147,448

(22) Filed: May 16, 2002

(65) Prior Publication Data

US 2003/0010409 A1    Jan. 16, 2003

(51) Int. Cl.
*B22F 3/00* (2006.01)
*B05D 1/36* (2006.01)
*B23K 26/00* (2006.01)

(52) U.S. Cl. .................. 419/8; 219/121.6; 427/185; 427/197; 427/597

(58) Field of Classification Search .......... 419/8–9, 419/11–12, 14–19, 45, 47; 428/545, 553, 428/565; 427/597, 197, 185; 219/121.6
See application file for complete search history.

(56) References Cited

U.S. PATENT DOCUMENTS

| | | | |
|---|---|---|---|
| 4,299,860 A | 11/1981 | Schaefer et al. | 427/556 |
| 4,627,896 A | 12/1986 | Nazmy et al. | 428/680 |
| 4,818,307 A | 4/1989 | Mori et al. | 148/414 |
| 4,818,562 A * | 4/1989 | Arcella et al. | 427/597 |
| 5,156,697 A | 10/1992 | Bourell | |
| 5,352,538 A | 10/1994 | Takeda et al. | 428/553 |
| 5,453,329 A | 9/1995 | Everett et al. | 428/565 |
| 5,911,949 A | 6/1999 | Ninomiya et al. | 420/487 |
| 6,037,067 A | 3/2000 | Fujiki et al. | 428/652 |

* cited by examiner

*Primary Examiner*—Roy King
*Assistant Examiner*—Ngoclan T Mai
(74) *Attorney, Agent, or Firm*—Pepper Hamilton LLP

(57) ABSTRACT

Disclosed are reinforced metal matrix composites and methods of shaping powder materials to form such composites. Articles of manufacture are formed in layers by a laser fabrication process. In the process, powder is melted and cooled to form successive layers of a discontinuously reinforced metal matrix. The matrix exhibits fine grain structure with enhanced properties over the unreinforced metal, including higher tensile modulus, higher strength, and greater hardness. In some preferred embodiments, an in-situ alloy powder, a powder metallurgy blend, or independently provided powders are reinforced with boron and/or carbon to form the composite.

47 Claims, 6 Drawing Sheets

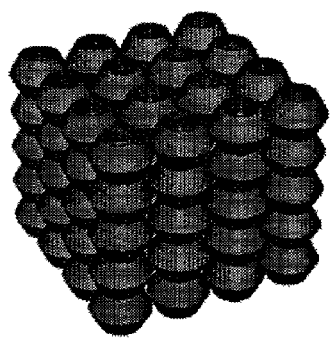 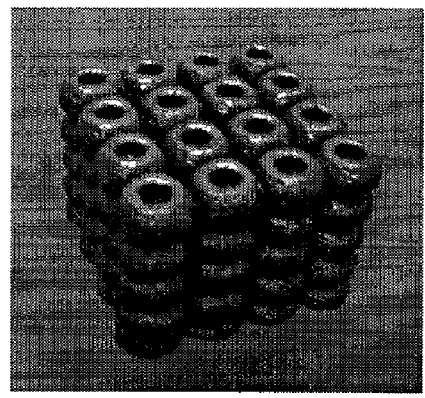
FIG. 2A  FIG. 2B

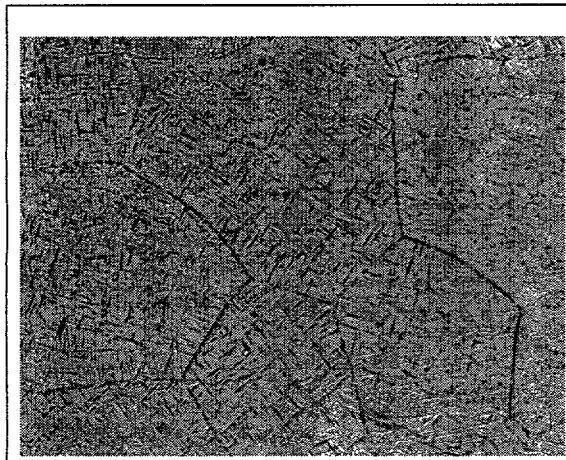 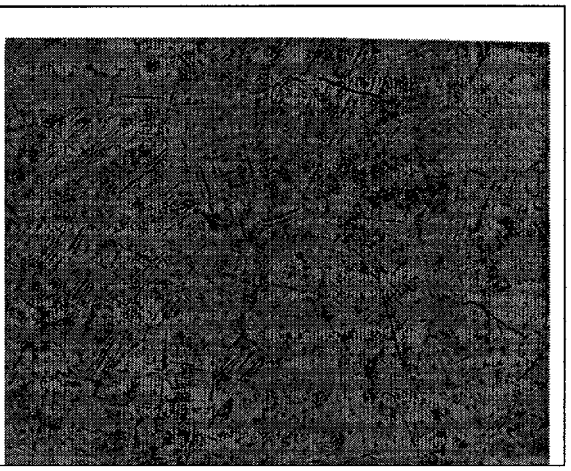
FIG. 5A    FIG. 5B

LASER FABRICATION OF DISCONTINUOUSLY REINFORCED METAL MATRIX COMPOSITES

STATEMENT REGARDING FEDERALLY SPONSORED RESEARCH

This invention was made with U.S. Government support under Contract No. F29601-98-C-0051 monitored by the Department of the Air Force and funded by the Ballistic Missile Defense Organization. The Government has certain rights in the invention.

CROSS-REFERENCE TO RELATED APPLICATION(S)

This application claims a right of priority to International application no. PCT/US00/31675, filed on Nov. 16, 2000, which claims priority to U.S. provisional application Ser. No. 60/165,658, filed on Nov. 16, 1999.

FIELD OF INVENTION

The present invention resides in the field of laser fabrication of materials, and more particularly relates to reinforced metal matrix composites and to methods of shaping powder materials to form such composites.

BACKGROUND OF THE INVENTION

Conventional methods of producing metal matrix composite (MMC) parts can be categorized into two main areas, powder metallurgy and casting. Powder metallurgy includes techniques such as hot isostatic pressing, vacuum hot pressing, and direct extrusion. Casting techniques generally involve pressure or pressureless casting of a molten metal into a preformed die to shape the molten metal accordingly. All of these procedures require expensive tools and machining, and thus are generally unattractive for producing a small quantity of parts.

When only a small quantity of replacement parts or prototypes are desired, subtractive methods typically are employed. Subtractive methods teach subtracting material from a starting block to produce a more complex shape. Examples include milling, grinding, drilling, and lathe cutting. Conventional subtractive methods are deficient because they produce a large amount of waste material for disposal, involve a large initial expense in setting up the tooling, and result in significant tool wear which increases operating costs. Furthermore, such methods cannot produce parts with unique shapes or complicated internal formations.

Other conventional processes are additive, such as welding, plating, and cladding. Such processes are generally limited to coating or depositing material on a starting article. More recently lasers have been used to build a part under computer aided design/ computer aided manufacturing (CAD/CAM) control, where a laser is directed at a surface and powder flows to the surface from a hopper via a powder feed device. The laser builds the part in layers as it heats, melts, and shapes the part in a desired configuration. Such a method is disclosed in U.S. Pat. No. 5,156,697 to Bourell et al. (Bourell). Bourell is hereby incorporated by reference in the present application. U.S. Pat. No. 6,046,426 to Jeantette, U.S. Pat. No. 5,993,554 to Keicher et al., and U.S. Pat. No. 5,961,862 to Lewis et al. also describe a process for making unreinforced metal parts using the process described herein for making MMC parts.

Bourell is directed to producing parts from either powders mixed together, such as mixed copper and tin particles, or coated powder particles, such as iron or steel coated with poly methyl methacrylate (see Column 8, lines 29-60). The disclosure for mixed particles is limited to two materials which have different bonding or disassociation temperatures (see Column 8, lines 61-66). Applications for coated powder particles are limited due to the prohibitive cost of such particles. Coated materials typically require metal or ceramic particles to be sprayed with a coating over the particles and are very expensive to produce.

Parts produced by the method of Bourell exhibit a higher melting point than the constituent materials of the powder, but offer no other notable property enhancements.

Titanium based alloys (i.e. alloys comprising a mixture of titanium and at least one other metal, such as Ti-6Al-4V) have been used as a matrix with a reinforcement material to increase strength and modulus. The matrix can be formed by the conventional technique of cladding, where a layer of reinforcement material is deposited on a layer of metal alloy particles. Such techniques are disclosed in U.S. Pat. No. 4,906,430 to Abkowitz et al. where the materials are pressed and sintered together, and U.S. Pat. No. 4,968,348 to Abkowitz et al., where $TiB_2$ is the reinforcement material formed by blending and sintering the material. U.S. Pat. No. 4,731,115 to Abkowitz et al. discloses a cladding process where TiC serves as the reinforcement formed by blending, pressing, and sintering the material.

Under the conventional cladding process as taught in the Abkowitz patents, the metal alloy material and reinforcement material are blended together and then pressed and sintered in a mold or die at elevated temperature to form discontinuously reinforced metals (DRX, where X represents the metal). DRX composite materials are characterized by a metal matrix with a reinforcement interspersed in the matrix. Such composite structures have been produced using conventional powder metallurgy and casting techniques as described in the Abkowitz patents, but have not been successfully produced using laser processing.

The article titled "Evaluation of a Discontinuously Reinforced Ti-6Al-4V Composite" by Yolton et al. (Yolton) discloses a process of synthesizing an in-situ Ti-6Al-4V composition containing additions of boron and/or carbon to form TiB and/or TiC reinforcements. Yolton obtains a fine distribution of TiB and TiC reinforcements through conventional processes of hot pressing followed by extrusion of the hot pressed material. In the hot pressing process, a structure is fabricated from Ti-6Al-4V and reinforcement material which could be formed in a mold or in a sheet or block. Thereafter, an extrusion process is carried out in which the shape of the hot pressed structure is destroyed. Extrusion involves thermal-mechanically working the structure, which changes the shape and causes the reinforcements to align in the direction of extrusion. In the final structure, Yolton did not achieve a desired random orientation of reinforcement particles. And further, near net shaped structures or parts cannot be made without taking additional steps to mechanically work the hot pressed structure.

SUMMARY OF THE INVENTION

It was unexpectedly found that articles of manufacture having a near net shape and comprising a metal matrix composite having improved physical properties, a fine grain structure, and a substantially uniform and random distribution of fine reinforcements could be produced in accordance with the teachings of the present invention. Previously known methods of achieving metal matrix composites having a fine grain structure required, hot pressing, e.g., hot isostatic pressing (HIPping) of precursor powders, followed by thermomechanical processing, e.g., extrusion, and finally shaping of the metal matrix composite, e.g., machining. The combination of fine grain structure, substantially uniform and random distribution of fine reinforcements, and enhanced physical properties achieved by the present invention was not heretofore achieved.

The present invention is an application of the Laser Engineered Net Shaping (LENS) process, in conjunction with one or more metals containing reinforcement materials for direct fabrication of discontinuously reinforced metal matrix composites (MMC's). The MMC's are formed by transporting one or more metals in powder form to a laser device where the metal(s) are melted and deposited to form a discontinuously reinforced metal matrix composite with enhanced properties. Three types of MMC powder materials particularly useful in the practice of the present invention are 1) in-situ powders (i.e., prealloyed powders where the reinforcement is formed from the alloy chemistry of the powder upon deposition); and/or 2) powder metallurgy blends where the reinforcement and metal matrix powders are blended and fed to the laser together; and/or 3) independent powder feeds where the metal matrix powder and reinforcement powder are fed independently and brought into contact on or near deposition.

The present invention involves the application of a laser deposition process (such as LENS) for the fabrication of discontinuously reinforced titanium alloy (DRTi) metal matrix composites. The application and utilization of pre-alloyed, in-situ metal alloy powder compositions is disclosed. Specifically, a Ti alloy powder (such as Ti-6Al-4V) containing about 0-35% (by weight) boron (B) and/or about 0-20% (by weight) carbon (C) additions for forming borides (TiB/$TiB_2$) and/or carbide (TiC) discontinuously reinforced titanium alloy metal matrix composites (DRTi's) as demonstrated with the commercially available Ti-6Al-4V+1.4B and Ti-6Al-4V+1.3B+0.6C compositions is disclosed.

The present invention further involves the application and utilization of powder metallurgy blends containing about 0-40% (by volume) ceramic particle reinforcements such as alumina, silicon carbide, and/or boron carbide with the remaining volume comprising the metal matrix powder such as aluminum or an aluminum alloy, titanium or a titanium alloy, copper or a copper alloy, nickel or a nickel alloy, and/or iron or an iron alloy.

Disclosed in the present invention is the application and utilization of a multi-feeder system to co-deposit intermetallic or ceramic particle reinforcements such as alumina, silicon carbide, and/or boron carbide with metal matrix powders such as aluminum or an aluminum alloy, titanium or a titanium alloy, copper or a copper alloy, nickel or a nickel alloy, and/or iron or an iron alloy, such that the volume fraction of reinforcement material may be held at a constant value between about 0-40% or varied from about 0-40% to form a gradient material.

The laser deposition process disclosed in the present invention led to near net shape fabrication of complex DRTi metal matrix composites. Microstructural refinements (i.e. fine grain sizes, fine reinforcement phases, and random and uniform distribution) relating to property enhancements were present in DRTi metal matrix composites such as demonstrated with the Ti-6Al-4V+1.4B and Ti-6Al-4V+1.3B+0.6C compositions.

The present invention is directed to structures and parts comprising discontinuously reinforced metal matrix composites and methods of fabricating such structures and parts, preferably near net shape structures and parts, using a laser fabrication process. In the laser fabrication process, powder is delivered to a focal area of a laser beam where it is melted and deposited. The position of the deposit is controlled by a computer using CAD/CAM technology. As each deposition cools, additional material is deposited thereon and a structure or part is built. In this way, discontinuously reinforced metal matrix (DRX) composites can be formed. The laser fabrication process is useful for producing a near net shape part in a cost effective manner without the need for tooling, dies, molds, or extensive machining.

According to one method for use in the present invention, powder is fed from one or more hoppers and directed toward a substrate using a powder feed device. Useful powder includes in situ powders, powder metallurgy blends, and/or independently fed powders, where the reinforcement material is intermetallic or ceramic in nature. In titanium and its alloys, the preferred reinforcements include titanium boride (TiB), titanium diboride ($TiB_2$), and titanium carbide (TiC). Other preferred reinforcements include alumina ($Al_2O_3$), silicon carbide (SiC), or other suitable ceramics or intermetallics for other metals such as aluminum.

In one preferred embodiment, the powder is an in-situ metal alloy powder where the reinforcements form as a precipitation product. The precipitation product is interspersed in the final structure or part to form a discontinuously reinforced metal matrix composite. Alternatively, metal particles and reinforcement particles may be mixed in a single hopper and fed to the substrate together, or may be deposited separately on the substrate from two or more hoppers and mixed upon deposition. Under each of these alternative methods, the reinforcements become fully integrated into the metal matrix composite as a result of laser fabrication.

According to another preferred embodiment of the present invention, the laser beam is directed at the substrate under CAD/CAM control. As the powder is deposited, it is heated, melted, and shaped according to a predetermined pattern. The shaped powder is then allowed to cool, and the reinforcement is formed as a precipitation product. Material is successively built upon previous depositions to form the structure or part. The metal matrix composite exhibits a fine grain structure with a substantially uniform and random distribution of the reinforcement resulting in enhanced properties over a conventional unreinforced metal structure.

Enhanced properties exhibited by the laser deposited metal matrix composite include: increased strength over the unreinforced metal (>about 15-30%), higher tensile modulus over the unreinforced metal (>about 10-25%), increased hardness over the unreinforced metal (>about 5-10%), and superior fatigue life. Discontinuously reinforced metal matrix composites made by the laser fabrication process produce structures and parts with substantial property improvements over parts made with unreinforced metal particles, including those processed by conventional means such as sintering and laser processed unreinforced metal parts. The substantial property improvements are due to the fine grain structure obtained in the matrix and substantially uniform and random distribution of the reinforcement, which produces higher tensile modulus, strength, and hardness measurements.

In particular, the laser fabrication process produces enhanced properties in DRTi materials. Examples are structures or parts made from Ti-6Al-4V+1.4B and Ti-6Al-4V+1.3B+0.6C in-situ alloy powders. Such structures/parts exhibited substantial property improvements in the as-deposited condition, and after heat treatment or hot isostatic pressing (HIPping).

According to the method and structures made by the method of the present invention, discontinuously reinforced metal matrix composites can be produced at low cost using a laser fabrication process.

BRIEF DESCRIPTION OF THE DRAWINGS

FIG. 2A is a computer aided design (CAD) solid model of a cellular structure.

FIG. 2B is a discontinuously reinforced titanium cellular structure made from an in-situ Ti-6Al-4V+1.6B powder according to the model of FIG. 2A.

FIGS. 5A and 5B are photographs of transverse sections of laser deposited Ti-6Al-4V and Ti-6Al-4V+1.3B+0.6C structures, respectively.

DETAILED DESCRIPTION OF THE INVENTION INCLUDING THE PREFERRED EMBODIMENT(S)

Figure 1:
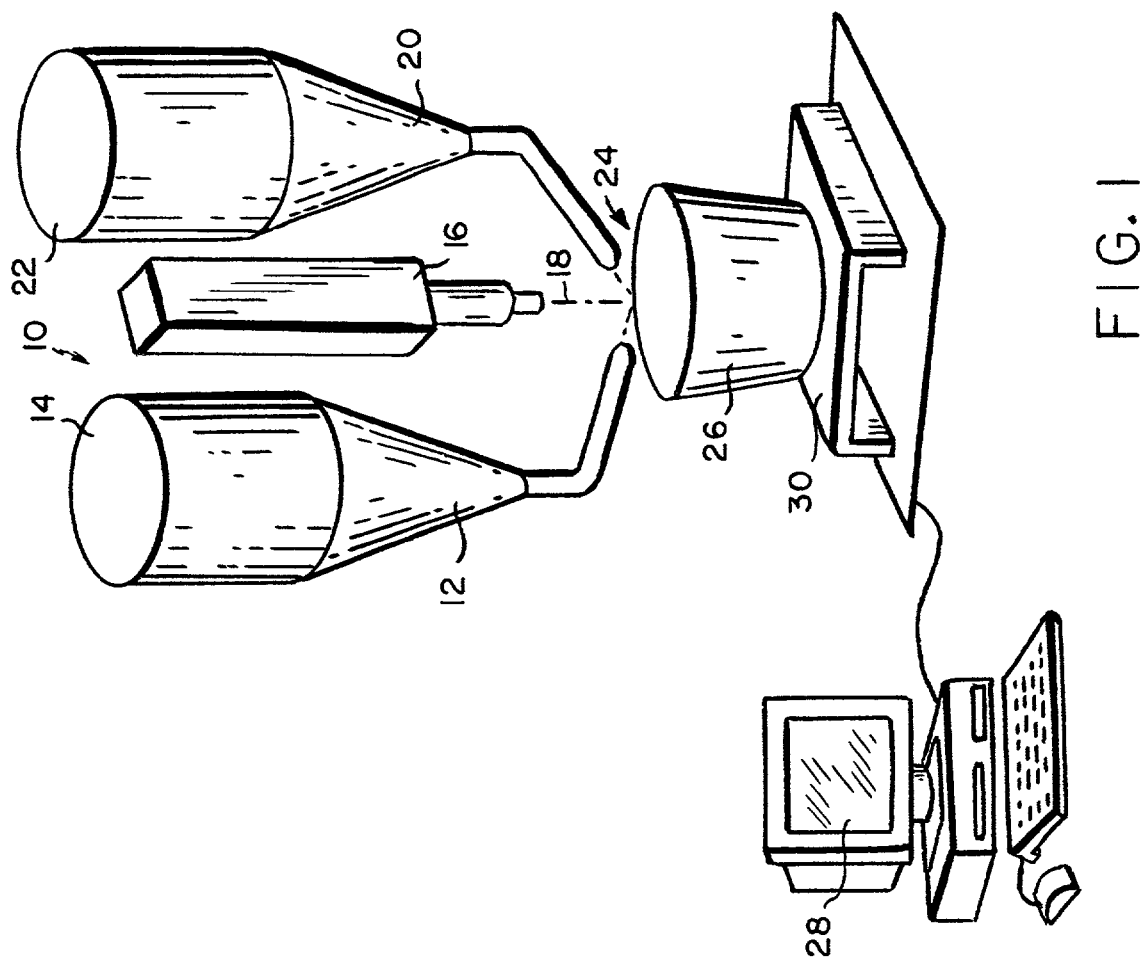
FIG. 1 is a schematic representation of a laser fabrication process used to form discontinuously reinforced composites according to the present invention.

Structures comprising metal matrix composites having a fine structure are provided by the present invention. In preferred structures, the composites are fine grained with a substantially uniform distribution and random orientation of the reinforcing material(s). One preferred method of forming metal matrix composite structures and parts of the present invention is illustrated in FIG. 1. In this embodiment the method of the present invention is carried out using a laser fabrication apparatus 10 having a first hopper 12 containing powder 14, where the first hopper deposits the powder 14 in a feed zone 24 beneath a laser 16. Laser beam 18 is directed at the feed zone to heat and melt the powder to form a deposition in a structure or part 26. Material is added to previous depositions formed upon substrate 30 to gradually build the structure/part. The substrate may be preferably preheated before receiving depositions of the structure/part.

In a first preferred embodiment of the invention, powder 14 is an in-situ alloy powder where each powder particle contains reinforcement particles in a metal matrix. The amount of reinforcement present in the in-situ alloy powder is dependent upon the alloy chemistry. Powder 14 is then deposited from hopper 12 to feed zone 24. Under the heat of laser beam 18, the powder is melted, and reinforcements are formed as a precipitation product in the deposition as it cools. The resulting structure/part contains a metal matrix with the reinforcements interspersed therein producing a discontinuously reinforced metal (DRX) matrix composite.

In the first preferred embodiment, powder 14 is an in-situ alloy powder having reinforcements formed in metal/metal alloy particles ("metal particles").

The metal particles preferably are selected from a group including: titanium or titanium and its alloys, aluminum or aluminum and its alloys, copper or copper and its alloys, nickel or nickel and its alloys, and iron or iron and its alloys including steels. Preferred in-situ titanium based alloy powders can be selected from the group of: Ti-6Al-4V+1B, Ti-6Al-4V+1.4B, and Ti-6Al-4V+1.3B+0.6C. Other types of metal particles can be used in the present invention.

For titanium and its alloys, the reinforcements are formed from alloys which preferably contain approximately 0-35% by weight of boron and/or approximately 0-20% by weight of carbon. These in-situ alloys form titanium boride (TiB), titanium diboride ($TiB_2$), and/or titanium carbide (TiC) as the reinforcement.

Figure 4A:
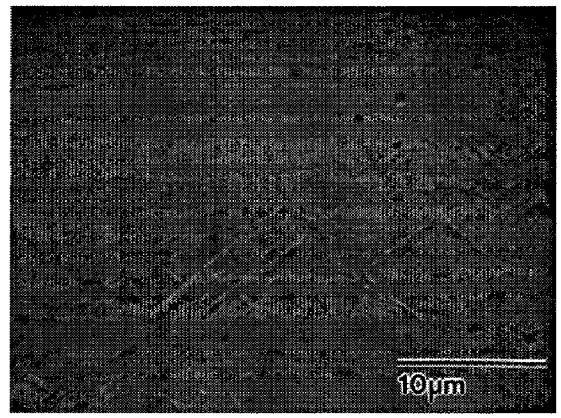
FIG. 4A is a micrograph snapshot of as-deposited Ti-6Al-4V (unreinforced titanium alloy).
Figure 4B:
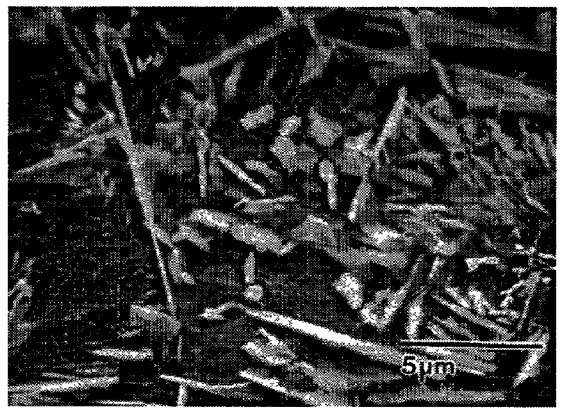
FIG. 4B is a micrograph snapshot at a higher magnification than FIG. 4A of as-deposited Ti-6Al-4V+1.4B.
Figure 4C:
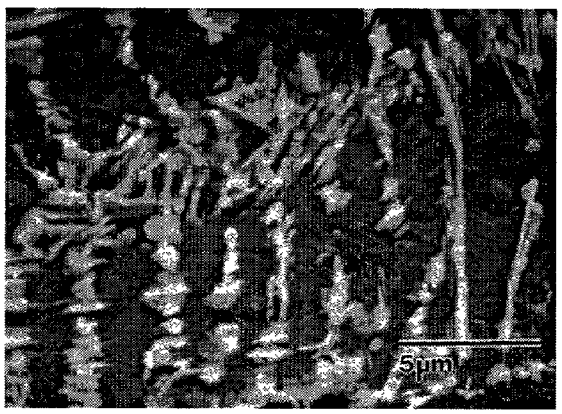
FIG. 4C is a micrograph snapshot at a higher magnification than FIG. 4A of as-deposited Ti-6Al-4V+1.3B+0.6C.

Titanium microstructures are complex and their properties depend not only on the alloy composition but also on their thermal-mechanical history. Titanium compositions may primarily be broken down into beta (body centered cubic), alpha (hexagonal), and alpha-beta phase structures and variations thereof, depending on processing history. For laser depositions, the thermal history, i.e., the rate of solidification from the liquid melt and cooling through the high temperature beta phase field primarily determines the alpha-beta microstructures obtained. Examinations of laser fabricated Ti-6Al-4V, Ti-6Al-4V+1.4B, and Ti-6Al-4V+1.3B+0.6C, as shown in FIGS. 4A-4C respectively, suggest that the cooling rates during laser deposition are sufficiently rapid from the beta field to form acicular alpha (or a'). Alpha prime is a beta transformation product, or martensitic structure, possessing high strength that may exhibit considerable toughness depending upon the fineness of the acicular lath-like morphology and the crystallographic orientation of the phase. Since cooling rates are continuously changing during the laser fabrication process, various microstructures are developed along the solidification path. Also, desirable microstructures can be obtained via various post-treatments such as heat treatment and hot isostatic pressing (HIPping) after the structure or part is built. The grain structure shown in FIGS. 4A-4C is a fine grain structure due to processing by the laser.

Laser 16 is preferably used in the Laser Engineered Net Shaping (LENS) process. The laser is guided under computer control to follow a predetermined pattern to build the structure or part. The laser is operated under computer aided design/ computer aided manufacture (CAD/CAM) techniques, where the two-dimensional plane of substrate 30 contains imaginary x- and y-axes, and the laser moves longitudinally toward and away from the substrate along an imaginary z-axis.

Laser fabrication provides for rapid cooling, as laser beam 18 produces intense heat directed at relatively local regions of the matrix. Due to the relatively large surface area of the melted material compared to its volume, energy can be removed rapidly and fast cooling is achieved. Fine grain structure is achieved in the part due to the rapid cooling. Because near net shape processing is obtained, the part requires minimal post machining.

Metal matrix composites made according to a preferred method of the present invention exhibit fine grain structure with enhanced properties including: increased strength (>about 15-30%), higher tensile modulus (>about 10-25%), increased hardness (>about 5-10%), and superior fatigue life, as compared with unreinforced metals.

Such metal metal matrix composites exhibit these enhanced properties in the as-deposited condition. Further enhancements are possible by subjecting the composite material to various post-treatments including heat treatment and hot isostatic pressing (HIPping). Such post-treatments are conventional processes known in the art for refining structures and parts. According to the method of this invention, the as-deposited composites could be subject to heat treatment in about the 600° C.-1100° C. range.

In a second preferred embodiment of the laser fabrication apparatus 10, powder 14 includes a mix of metal particles and reinforcement particles, which are combined in hopper 12 in the desired proportions and directed to feed zone 24 where they mix together to form a discontinuously reinforced metal matrix composite. This second embodiment is useful when, for example, a particular in-situ alloy powder composition is not available or when experimenting with different amounts or types of reinforcement particles. The relative amounts of metal particles and reinforcement particles in the matrix can be controlled by depositing appropriate amounts of the respective particles into hopper 12.

In the second preferred embodiment, one of the powder constituents could be an in-situ alloy with the other an unreinforced metal. This would enable the varying of the amount of reinforcement in the part without having to produce a particular in-situ alloy powder composition.

The in-situ alloy powder may vary from 0 to 100% of the powder in the hopper, where 100% is the preferred amount in the first preferred embodiment.

In a third preferred embodiment of the laser fabrication apparatus 10, dual feed hoppers 12 and 20 are used. The first hopper 12 contains metal particles 14, while a second hopper 20 contains reinforcement particles 22, as shown in FIG. 1. In the dual feed apparatus, the relative proportions of metal particles to reinforcement particles are controlled through monitoring the feed rates of the two hoppers.

For the second and third preferred embodiments, preferred reinforcement particles include titanium diboride ($TiB_2$) and/or titanium carbide (TiC) for titanium based alloys. Other preferred reinforcement particles include alumina ($Al_2O_3$), silicon carbide (SiC), boron carbide ($B_4C$), and/or other suitable ceramics or intermetallics. The volume fraction of reinforcements in a matrix may be approximately 0-40%, more preferably about 10-25%.

Other suitable reinforcements comprise ceramics such as oxides, borides, suicides, carbides, or nitrides (e.g. boron nitride BN). Preferred ceramics or intermetallics include materials with high melting points that preferably crystallize or otherwise precipitate in small particles upon cooling prior to or during solidification of the metal matrix. The above reinforcements are listed for illustrative purposes only and are not intended to limit the present invention.

For any of the above preferred embodiments of this invention, still other metal particles can be used including, but not limited to: magnesium, calcium, scandium, yttrium, lanthanum, zirconium, hafnium, vanadium, niobium, tantalum, chromium, molybdenum, tungsten, manganese, rhenium, ruthenium, osmium, cobalt, rhodium, iridium, palladium, platinum, silver, gold, zinc, cadmium, gallium, indium, silicon, tin, and lead. Also suitable are metal alloy particles that comprise a mixture of two or more suitable metals. Preferred metal or metal alloy particles comprise metal or metal alloys that are capable of forming reinforcements upon cooling a liquefied sample of the particles upon deposition.

The first and second preferred embodiments of this invention are not limited to a single hopper feed. A second hopper 20 or additional hoppers could be used to increase the rate of part fabrication. The second hopper 20 would contain particles 22 similar to particles 14 in the first hopper 12. Additional hoppers would contain added amounts of the same type of particles. In addition to increasing the rate of part fabrication, additional hoppers could be used to deposit more than one type of reinforcement.

Accordingly, the invention provides processes for laser fabrication of metal matrix composites. The process includes the steps of evaluating material constituents (metal or metal alloy powders with ceramic or intermetallic reinforcements); incorporating powder feeder configurations and powder feeder nozzle designs in a laser deposition system design; and selecting laser and powder feeder process parameters for DRX fabrication(s).

Powders useful in the practice of the present invention are well known in the art. The powder used in the present invention can be a powder selected from the group of: Ti-6Al-4V (unreinforced powder), Ti-6Al-4V+1B (in-situ), Ti-6Al-4V+1.4B (in-situ), Ti-6Al-4V+1.3B+0.6C (in-situ), Ti-6Al-4V+3C (blended), Ti-6Al-4V+5C (blended), and Ti-6Al-4V+20TiC (blended). However, these examples are for illustration purposes only and are not intended to limit the present invention.

Titanium alloys containing approximately 0-35%, more preferably about 0.5 to 10% by weight of boron and/or about 0-20%, more preferably about 0.5 to 5% by weight of carbon, produce suitable boron/carbon reinforcements including titanium boride (TiB), titanium diboride ($TiB_2$), and/or titanium carbide (TiC). The above reinforcements are listed for illustrative purposes only and are not intended to limit the present invention.

These titanium DRX materials have shown enhanced properties in the as-deposited condition and after being subjected to various post-treatments. The titanium DRX compositions of interest are the boron and boron plus carbon in-situ composite materials. Calculated estimates of volume fraction reinforcements (assuming all C and B is converted into either TiB, $TiB_2$, and/or TiC in the metal matrix) indicate relatively large strength increases are achievable for small volume fractions of the reinforcement phase(s). Such results have been validated by experimentation, as discussed below.

For the Ti-6Al-4V+1.4B and Ti-6Al-4V+1.3B+0.6C fine microstructures, the reinforcement phases (or precipitates) of borides and/or carbides are difficult to observe using optical means. However, calculated estimates of volume fraction reinforcements (assuming all B and C is converted into either TiB, $TiB_2$, and/or TiC in the Ti-6Al-4V matrix) indicates that the relatively large increases in tensile strengths achieved are for small volume fraction of the reinforcement phase(s). Those calculations resulted in reinforcement contents of approximately 7 volume percent (v %) TiB for the Ti-6Al-4V+1.4B weight percent composition, and 6.5 v % $TiB_2$/2.6 v % TiC for the Ti-6Al-4V+1.3B+0.6C weight percent composition.

Discussed below are examples of composites made with in-situ powders by the laser fabrication process. Powders were obtained from Crucible Research for use in the experiments. The laser deposition system used is from Optemec, model 750.

EXAMPLE USING IN-SITU Ti-6Al-4V+1.4B

Figure 3A:
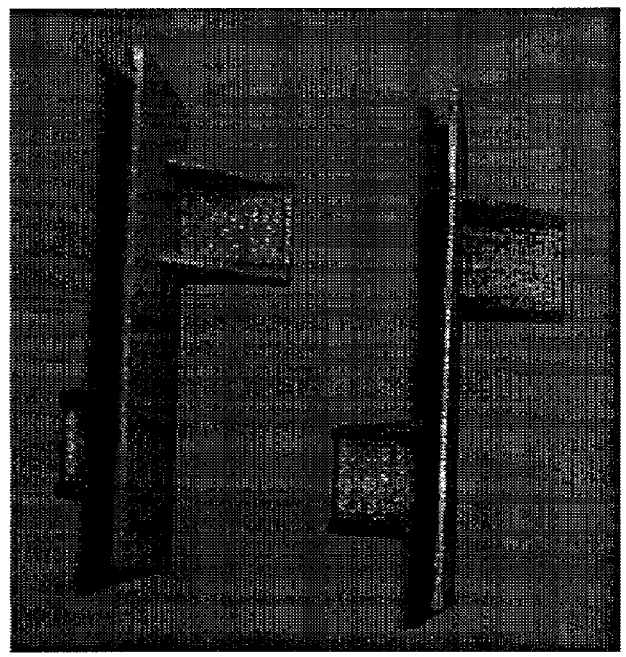
FIGS. 3A and 3B are laser fabricated mounting brackets made from an in-situ Ti-6Al-4V+1.6B powder.
Figure 3B:
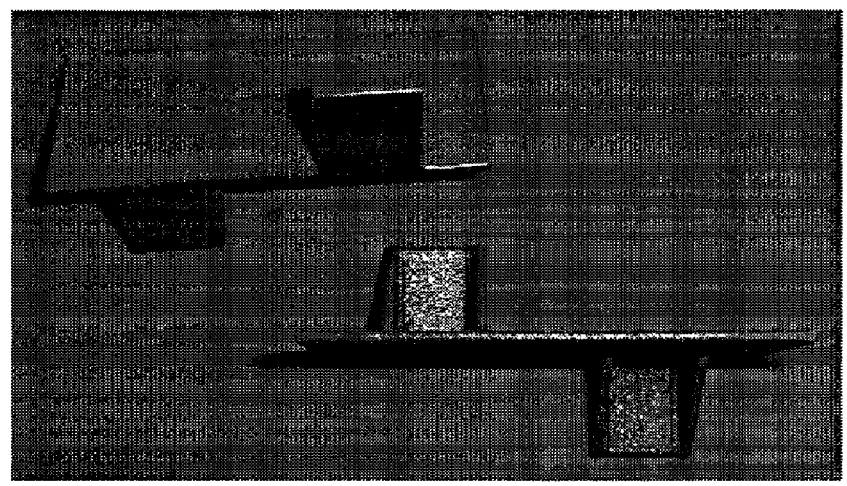

In a series of tests, an in-situ powder Ti-6Al-4V+1.4B was deposited to form various parts, where the powder included reinforcements with a boron content of 1.4B. FIGS. 2A and 2B illustrate a sample cellular structure produced with Ti-6Al-4V+1.4B according to the method of the present invention. FIG. 2A is a CAD solid model design which formed the basis for the design of the cellular structure. The design was programmed in computer 28 and the cellular structure built up layer-by-layer to form a unique shape based on the solid model design. As shown in FIG. 2B, the resulting structure followed closely the intended design. FIGS. 3A and 3B show other parts constructed according to the method of this invention. In FIGS. 3A and 3B, mounting brackets made from Ti-6Al-4V+1.4B in-situ alloy powder are depicted. The mounting brackets were produced from a CAD model preprogrammed into computer 28 and built up in a layered structure. Each layer was approximately 150 to 200 microns in thickness.

FIGS. 4A and 4B are scanning electron microscope views of titanium alloy microstructures as deposited by the laser fabrication process. FIG. 4A depicts the microstructure of Ti-6Al-4V, which is a titanium alloy without reinforcement particles (i.e. unreinforced titanium alloy). FIG. 4B is a view of as-deposited Ti-6Al-4V+1.4B magnified over the view of FIG. 4A to show the various needles, ribbons, and grains of the fine microstructure. These needles and ribbons constitute TiB reinforcements which formed in the microstructure. As seen in FIG. 4B, such reinforcements have a high aspect ratio of needle and/or ribbon morphologies. The size of the TiB reinforcements is on the order of up to a few microns in length and on a nano-scale in width. The size and morphology of the reinforcements contribute significantly to the strength of the material, which provides advantages over conventionally produced DRX materials. Additionally, the laser fabrication process produces a substantially uniform and random distribution of the reinforcement which also contributes to the enhanced strength of the material. Further, the deposited Ti-6Al-4V+1.4B exhibits significant property enhancements over the unreinforced titanium alloy, as discussed below.

EXAMPLE USING IN-SITU Ti-6Al-4V+1.3B+0.6C

In a further set of tests, in-situ Ti-6Al-4V+1.3B+0.6C was laser deposited to form metal matrix composites according to the present invention. As shown in FIG. 5B, a fine microstructure was obtained for structures formed from Ti-6Al-4V+1.3B+0.6C. As compared with the unreinforced titanium alloy shown in FIG. 5A, the as-deposited Ti-6Al-4V+1.3B+0.6C exhibited a much finer microstructure and enhanced properties, as further described below.

As shown in FIG. 4C, the reinforcements present in the Ti-6Al-4V+1.3B+0.6C microstructure were somewhat coarser than in the Ti-6Al-4V+1.4B microstructure but finer than the Ti-6Al-4V microstructure. The reinforcements formed as ribbons of TiB and very fine particles of TiC.

Measured Properties of In-Situ DRTi

Figure 6:
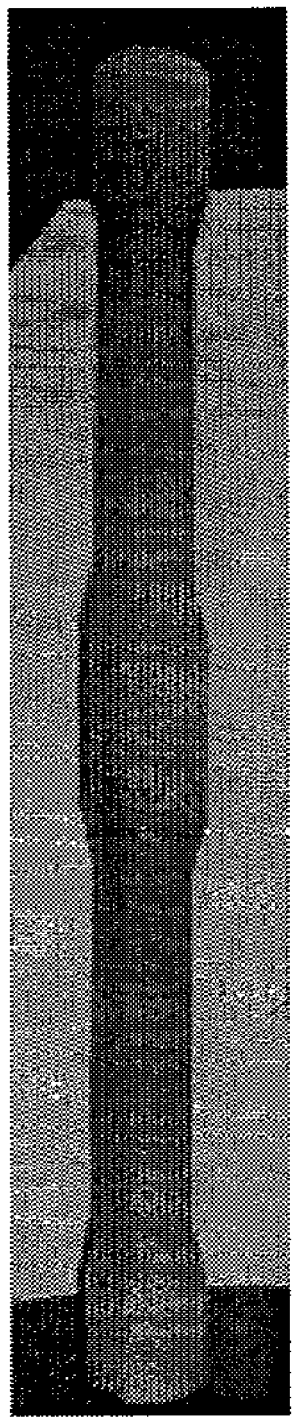
FIG. 6 is a photograph of a double-tiered test specimen made by the laser fabrication process.

To determine the mechanical properties of the laser fabricated structures, round specimens were used. The round specimens were machined from near net shape double-tiered circular cylinders, as shown in FIG. 6. The specimens measured approximately 0.50 inch in diameter by 5.5 inches long with reduced diameter gage sections of approximately 0.375 inch. Each double-tiered circular specimen was used to make two round tensile test specimens measuring 0.375 inch diameter by 2.375 inches long with a test gage section of 0.250 inch diameter by 1.50 inches long.

To baseline the laser fabrication process, parameters were first developed for Ti-6Al-4V (unreinforced metal particles). The laser fabricated Ti-6Al-4V was tested in both the as-deposited condition and heat treated conditions. The heat treatment was performed at 975° C. for 60 minutes in a vacuum, followed by a furnace cool under vacuum to 750° C. and then argon back-fill and furnace cool under argon to 52° C. The discontinuously reinforced titanium (DRTi) materials were also tested in the as-deposited condition and after various post-treatments. These post-treatments included hot isostatic pressing (HIPping) and heat treatment. A summary of test results is provided in the following table, along with handbook modulus and strength measurements for conventional Ti-6Al-4V:

TABLE 1

Mechanical properties of laser Fabricated DRTi versus Ti-6Al-4V.

| Material | Condition | Tensile Modulus (Msi) | Yield Strength (Ksi) | Tensile Strength (Ksi) | Elongation (%) |
|---|---|---|---|---|---|
| Ti-6Al-4V | Mill Annealed | 16 | 120 | 130 | 10 |
| Ti-6Al-4V | As Deposited | 17 | 141 ± 2 | 159 ± 2 | 5.0 ± 4.8 |
| Ti-6Al-4V | Heat Treated | 17 | 138 ± 3 | 157 ± 4 | 14.3 ± 1.0 |
| Ti-6Al-4V + 1.4B | As Deposited | 22 | 188 ± 9 | 189 ± 15 | — |
| Ti-6Al-4V + 1.4B | Heat Treated | 20 | 172 ± 2 | 194 ± 2 | 2.0 ± 0 |
| Ti-6Al-4V + 1.4B | HIP | 20 | 172 ± 0.5 | 199 ± 1 | 3.3 ± 0.5 |
| Ti-6Al-4V + 1.3B + 0.6C | As Deposited | 20 | 185 ± 1 | 197 ± 5 | — |
| Ti-6Al-4V + 1.3B + 0.6C | Heat Treated | 20 | 190 ± 1 | 205 ± 4 | 1.0 ± 0.0 |
| Ti-6Al-4V + 1.3B + 0.6C | HIP | 20 | 190 ± 1 | 197 ± 5 | 1.2 ± 0.4 |

As seen from Table 1 above, laser fabricated Ti-6Al-4V is stronger than Ti-6Al-4V produced by a conventional process such as mill annealed wrought stock. The increased strength is due to the fine microstructure and substantially uniform and random distribution of the fine reinforcements imparted by the laser fabrication process. Also indicated is a dramatic increase in ductility. This is due to the homogenization of the layered structure during heat treatment.

The modulus of both DRTi materials, Ti-6Al-4V+1.4B and Ti-6Al-4V+1.3B+0.6C, increased by 25% as compared to the conventionally processed Ti-6Al-4V and the laser fabricated Ti-6Al-4V.

The strength of the laser fabricated Ti-6Al-4V+1.4B DRTi structure was significantly greater than the baseline laser fabricated Ti-6Al-4V. The Ti-6Al-4V+1.4B had an average yield strength over 20% greater than the baseline Ti-6Al-4V. The Ti-6Al-4V+1.4B DRTi subjected to HIP had a greatly reduced standard deviation in the observed mechanical behavior. For the HIPped Ti-6Al-4V+1.4B, the average yield strength dropped by 16 ksi while the average tensile strength increased by 10 ksi. The ductility was much improved over the as-deposited material. It is believed that the greater ductility most likely enabled greater plastic deformation to occur before the critical flaw size was reached and failure occurred.

The Ti-6Al-4V+1.3B+0.6C DRTi exhibited similar improved strengths as compared to the baseline Ti-6Al-4V at over 30% in the heat treated and HIPped conditions. However, the ductility was not as high. For the Ti-6Al-4V+1.3B+0.6C DRTi the heat treatment and HIPping slightly increased the strengths and ductility compared to the as-deposited material. As with the Ti-6Al-4V+1.4B DRTi, the greater ductility has most likely enabled greater plastic deformation to occur before the critical flaw size was reached.

In addition to the tensile mechanical properties, the hardness of each of the three materials was also determined. The results of the hardness testing are tabulated in the following table, along with the handbook range of hardness for conventional Ti-6Al-4V:

TABLE 2

Hardness of laser fabricated DRTi versus Ti-6Al-4V.

| Material | Process | Condition | Hardness (HRC) |
|---|---|---|---|
| Ti-6Al-4V | Wrought | Mill Annealed | 36–39 |
| Ti-6Al-4V | Laser | As Deposited | 38 |
| Ti-6Al-4V + 1.4B | Laser | As Deposited | 45 |
| Ti-6Al-4V + 1.3B + 0.6C | Laser | As Deposited | 48 |

The measured hardness of laser fabricated Ti-6Al-4V was within the reported handbook values. The DRTi materials exhibited approximately a 10% or greater increase in hardness.

As can be seen from the test data, laser fabrication of discontinuously reinforced titanium matrix composites results in significant improvements in tensile modulus, strength, and hardness as compared with conventionally processed and laser processed unreinforced metal particles.

Preliminary tests were performed on rectangular bar specimens. Tests were performed to determine tensile strength and 0.2% yield strength on the following laser processed compositions: Ti-6Al-4V (unreinforced metal particles), Ti-6Al-4V+1.4B (in-situ), Ti-6Al-4V+1.3B+0.6C (in-situ), and Ti-6Al-4V+5C (blended upon deposition). A summary of individual trial results is printed in the following table:

TABLE 3

Preliminary tensile properties of laser deposited structures.

| Composition | Tensile Strength (ksi) | Yield Strength (ksi) |
|---|---|---|
| Ti-6Al-4V (unreinforced) | 173 | 157 |
| | 164 | 149 |
| | 166 | 149 |
| Ti-6Al-4V + 1B (in-situ) | 190 | 181 |
| | 142 | Failed |
| | 56.5 | Failed |
| Ti-6Al-4V + 1.4B (in-situ) | 204 | 194 |
| | 175 | Failed |
| | 189 | 181 |
| Ti-6Al-4V + 1.3B + 0.6C (in-situ) | 196 | 184 |
| | 202 | 186 |
| | 192 | 186 |
| Ti-6Al-4V + 5C (blended) | 68 | Failed |
| | 74 | Failed |
| | 74 | Failed |

The unreinforced Ti-6Al-4V test bars exhibited visual "necking" after tensile fracture, indicating ductirle behavior. The strength values for the unreinforced Ti-6Al-4V laser fabricated test bars were 15-30% higher than for conventional annealed Ti-6Al-4V (typically 120-130 ksi, see Table 1). The in-situ Ti-6Al-4V compositions with boron and/or carbon demonstrated higher strengths, especially those with the higher boron content of 1.4B.

Results of the testing shows that titanium based in-situ DRX composites may be successfully fabricated in the laser deposition process, and produce microstructures with enhanced properties over unreinforced Ti-6Al-4V metal particles. In-situ Ti-6Al-4V with boron and/or carbon containing reinforcements have shown enhanced tensile properties in the as-deposited condition and with post-treatments including heat treatment and HIPping.

Although the invention has been described in detail including the preferred embodiments thereof, such description is for illustrative purposes only, and it is to be understood that changes and variations including improvements may be made by those skilled in the art without departing from the spirit or scope of the following claims.

What is claimed is:

1. A method of forming an article of manufacture comprising a metal matrix composite having a fine grain structure, where the method comprises the steps of:
providing an in-situ alloy powder to a substrate, wherein the powder comprises at least one metal and at least one reinforcement material, wherein the powder comprises titanium or a titanium alloy containing approximately 0-35% by weight of boron and/or approximately 0-20% by weight of carbon and wherein the at least one reinforcement material comprises boron, carbon and mixtures thereof or borides, carbides and mixtures thereof;
directing a laser at the substrate to heat and melt the powder, thereby shaping the powder as the laser follows a predetermined pattern over the substrate; and
allowing the shaped powder to cool and form the article of manufacture with the fine grain structure.

2. The method of claim 1, wherein the powder further comprises at least one of, aluminum, an aluminum alloy, nickel, a nickel alloy, copper, a copper alloy, iron, or an iron alloy.

3. The method of claim 1, wherein the article of manufacture is formed to a near net shape.

4. The method of claim 1, wherein the reinforcement material forms a precipitation product interspersed in the article of manufacture.

5. The method of claim 1, wherein during the step of directing the laser to melt the powder, substantially all of the reinforcement material in the powder is melted.

6. The method of claim 1, wherein the article of manufacture includes a substantially uniform and random distribution of the reinforcement material in the metal matrix composite.

7. A method of forming an article of manufacture comprising a metal matrix composite having a fine grain structure, comprising:
providing powder to a substrate, wherein the powder comprises at least one of Ti-6Al-4V+1B, Ti-6Al-4V+1.4B, Ti-6Al-4V+1.3B+0.6C, Ti-6Al-4V+3C, Ti-6Al-4V+5C, and Ti-6Al-4V +20TiC;
directing a laser at the substrate to heat and melt the powder, thereby shaping the powder as the laser follows a predetermined pattern over the substrate; and
allowing the shaped powder to cool and form the article of manufacture with the fine grain structure.

8. The method of claim 1, wherein the powder is provided to the substrate by at least one powder feeder.

9. The method of claim 1, wherein the article of manufacture exhibits a strength of at least about 30% greater than the unreinforced metal.

10. The method of claim 1, wherein the article of manufacture exhibits a strength of about 15-30% greater than the unreinforced metal.

11. The method of claim 1, wherein the article of manufacture exhibits a tensile modulus of at least about 25% greater than the unreinforced metal.

12. The method of claim 1, wherein the article of manufacture exhibits a tensile modulus of about 10-25% greater than the unreinforced metal.

13. The method of claim 1, wherein the article of manufacture exhibits a hardness of at least about 10% greater than the unreinforced metal.

14. The method of claim 1, wherein the article of manufacture exhibits a hardness of about 5-10% greater than the unreinforced metal.

15. The method of claim 1, wherein the fine grain structure of the article of manufacture results in higher strength.

16. The method of claim 7, wherein the article of manufacture is formed to a near net shape.

17. The method of claim 7, wherein upon heating, a reinforcement material is formed as a precipitation product interspersed in the article of manufacture.

18. The method of claim 7, wherein during the step of directing the laser to melt the powder, substantially all of the powder is melted.

19. The method of claim 17, wherein the article of manufacture includes a substantially uniform and random distribution of the reinforcement material in the metal matrix composite.

20. The method of claim 17, wherein the reinforcement material comprises a ceramic.

21. The method of claim 17, wherein the reinforcement material comprises borides and/or carbides.

22. The method of claim 7, wherein the powder is provided to the substrate by at least one powder feeder.

23. The method of claim 7, wherein the article of manufacture exhibits a strength of at least about 30% greater than the unreinforced metal.

24. The method of claim 7, wherein the article of manufacture exhibits a strength of at least about 15-30% greater than the unreinforced metal.

25. The method of claim 7, wherein the article of manufacture exhibits a tensile modulus of at least about 25% greater than the unreinforced metal.

26. The method of claim 7, wherein the article of manufacture exhibits a tensile modulus of at least about 10-25% greater than the unreinforced metal.

27. The method of claim 7, wherein the article of manufacture exhibits a hardness of at least about 10% greater than the unreinforced metal.

28. The method of claim 7, wherein the article of manufacture exhibits a hardness of at least about 5-10% greater than the unreinforced metal.

29. The method of claim 7, wherein the fine grain structure of the article of manufacture results in higher strength.

30. A method of forming an article of manufacture comprising a metal matrix composite having a fine grain structure, comprising:
providing a powder to a substrate, wherein the powder comprises a powdered mixture of at least one metal and at least one reinforcement material, wherein the reinforcement material comprises alumina, silicon carbide, or boron carbide, and is coated with a metal or a metal alloy and the at least one metal comprises titanium or a titanium alloy containing at least one of approximately 0-35% by weight of boron and approximately 0-20% by weight of carbon;
directing a laser at the substrate to heat and melt the powder, thereby shaping the powder as the Laser follows a predetermined pattern over the substrate; and
allowing the shaped powder to cool and form the article of manufacture with the fine grain structure.

31. The method of claim 30, wherein the metal of the powder mixture or the metal coating further comprises at least one of aluminum, an aluminum alloy, nickel, a nickel alloy, copper, a copper alloy, iron, or an iron alloy.

32. The method of claim 30, wherein the article of manufacture is formed to a near net shape.

33. The method of claim 30, wherein the powder comprises a powder metallurgy blend or independently provided powders.

34. The method of claim 33 wherein the reinforcement material forms a precipitation product interspersed in the article of manufacture.

35. The method of claim 30, wherein during the step of directing the laser to melt the powder, substantially all of the reinforcement material in the powder is melted.

36. The method of claim 30, wherein the article of manufacture includes a substantially uniform and random distribution of the reinforcement material in the metal matrix composite.

37. The method of claim 30, wherein the reinforcement material comprises borides and/or carbides.

38. The method of claim 30, wherein the powder is provided to the substrate by at least one powder feeder.

39. The method of claim 30, wherein the metal and the reinforcement material are brought into contact during the step of providing the powder to the substrate.

40. The method of claim 30, wherein the reinforcement material is mixed with the metal prior to the step of providing the powder to the substrate.

41. The method of claim 30, wherein the article of manufacture exhibits a strength of at least about 30% greater than the unreinforced metal.

42. The method of claim 30, wherein the article of manufacture exhibits a strength of at least about 15-30% greater than the unreinforced metal.

43. The method of claim 30, wherein the article of manufacture exhibits a tensile modulus of at least about 25% greater than the unreinforced metal.

44. The method of claim 30, wherein the article of manufacture exhibits a tensile modulus of at least about 10-25% greater than the unreinforced metal.

45. The method of claim 30, wherein the article of manufacture exhibits a hardness of at least about 10% greater than the unreinforced metal.

46. The method of claim 30, wherein the article of manufacture exhibits a hardness of at least about 5-10% greater than the unreinforced metal.

47. The method of claim 30, wherein the fine grain structure of the article of manufacture results in higher strength.

* * * * *